United States Patent [19]

Asanuma et al.

[11] Patent Number: 5,278,216
[45] Date of Patent: Jan. 11, 1994

[54] SYNDIOTACTIC POLYPROPYLENE RESIN COMPOSITION

[75] Inventors: Tadashi Asanuma, Osaka; Tetsunosuke Shiomura, Tokyo; Nobutaka Uchikawa, Osaka; Tateyo Sasaki, Osaka; Takeo Inoue, Osaka, all of Japan

[73] Assignee: Mitsui Toatsu Chemicals, Incorporated, Tokyo, Japan

[21] Appl. No.: 899,141

[22] Filed: Jun. 17, 1992

Related U.S. Application Data

[63] Continuation of Ser. No. 613,732, Nov. 27, 1990, abandoned.

[30] Foreign Application Priority Data

| Apr. 18, 1989 | [JP] | Japan | 1-96346 |
| Apr. 18, 1989 | [JP] | Japan | 1-96347 |
| Feb. 7, 1990 | [JP] | Japan | 2-25984 |

[51] Int. Cl.$^5$ .......................... C08K 5/09; C08K 3/32; C08K 3/34; C08K 5/16
[52] U.S. Cl. .................... 524/394; 524/186; 524/337; 524/386; 524/396; 524/414; 524/447; 524/449; 524/451; 528/480
[58] Field of Search .............. 524/337, 394, 396, 414, 524/447, 449, 451, 386, 186; 525/232, 240; 528/480

[56] References Cited

U.S. PATENT DOCUMENTS

| 3,258,455 | 6/1960 | Natta et al. | 526/159 |
| 4,407,998 | 10/1983 | Duvdevani | 524/394 |
| 4,892,851 | 1/1990 | Ewen et al. | 502/104 |

FOREIGN PATENT DOCUMENTS

| 48-14425 | 5/1973 | Japan . |
| 54-4069155 | 6/1979 | Japan . |
| 58-8185224 | 10/1983 | Japan . |
| 60-6338 | 3/1985 | Japan . |

OTHER PUBLICATIONS

H. N. Beck, "Heterogeneous Nucleating Agents for Polypropylene Crystallization", vol. II, J. of App. Poly. Sci. pp. 673–685 (1967).

Primary Examiner—Paul R. Michl
Assistant Examiner—Tae H. Yoon
Attorney, Agent, or Firm—Burns, Doane, Swecker & Mathis

[57] ABSTRACT

A syndiotactic polypropylene resin composition comprising a polypropylene having a substantially syndiotactic structure and a nucleating agent. The syndiotactic polypropylene may be a homopolymer of the propylene, a copolymer of the propylene and a smaller amount of another olefin or a mixture of the above-mentioned (co)polymer and an isotactic polypropylene. The resin composition preferably has a higher crystallization temperature than a polypropylene containing no nucleating agent by 5° C. or more, as measurement is made by a differential scanning thermal analysis.

14 Claims, No Drawings

SYNDIOTACTIC POLYPROPYLENE RESIN COMPOSITION

This application is a continuation, of application Ser. No. 07/613,732, filed Nov. 27, 1990 now abandoned.

TECHNICAL FIELD

The present invention relates to a resin composition which contains a polypropylene having a substantially syndiotactic structure and a nucleating agent and which has good physical properties.

BACKGROUND ART

A syndiotactic polypropylene has been known for a long period of time. Such a polypropylene is prepared by polymerization at a low temperature in the presence of a conventional catalyst comprising a vanadium compound, an ether and an organic aluminum compound, but the thus prepared syndiotactic polypropylene is poor in syndiotacticity and it scarcely has syndiotactic characteristics.

A polypropylene having good tacticity, i.e., a syndiotactic pentad fraction of more than 0.7 in accordance with $^{13}$C-NMR has been discovered for the first time by J. A. Ewen et al. which can be obtained by polymerizing propylene in the presence of a polymerization catalyst comprising compounds of transition metals (Hf and Zr) having an asymmetric ligand and methyl aluminoxane (J. Am. Chem. Soc., 110, 6255-6256, 1988).

In the J. A. Ewen et al. method described above, the activity per transition metal is high, and the obtained syndiotactic polypropylene is excellent in syndiotacticity and physical properties inclusive of impact resistance. However, this kind of syndiotactic polypropylene has the problem that stiffness is poor. In addition, when propylene is copolymerized with another olefin by the use of the above-mentioned method, a copolymer can be obtained which is composed of propylene and the other olefin and which has a substantially syndiotactic structure. However, the thus obtained copolymer is difficult to crystallize, and when molded, there is the same problem that the above-mentioned syndiotactic polypropylene has.

DISCLOSURE OF THE INVENTION

An object of the present invention is to provide a syndiotactic polypropylene resin composition having a high crystallization temperature and having excellent physical properties, particularly high stiffness when molded.

The syndiotactic polypropylene resin composition according to the present invention is composed of a polypropylene having a substantially syndiotactic structure and a nucleating agent.

This resin composition preferably has a 5° C. higher crystallization temperature than a polypropylene having the substantially syndiotactic structure in which any nucleating agent is not contained, as measurement is made by a differential scanning calorimetry.

In the present invention, the crystallization temperature can be defined as follows: The polymer is melted at 240° C. and then maintained for 5 minutes, and its temperature is allowed to fall at a rate of 10° C./minute. At this time, the above-mentioned crystallization temperature is observed as an exothermic peak due to crystallization.

BEST MODE FOR CARRYING OUT THE INVENTION

In the present invention, a polypropylene having a substantially syndiotactic structure include a homopolymer of propylene having the substantially syndiotactic structure and a copolymer having the substantially syndiotactic structure of propylene and another olefin having 2 to 25 carbon atoms. Examples of the olefin other than propylene include ethylene and compounds represented by the general formula $CH_2=CH-R$ (wherein R is an alkyl group having 2 to 18 carbon atoms, preferably 2 to 12 carbon atoms which may branch). Typical examples of these compounds include straight-chain olefins such as butene-1, pentene-1, hexene-1, heptene-1, octene-1, nonene-1, decene-1, undecene-1, dodecene-1, tridecene-1, pentadecene-1, hexadecene-1, heptadecene-1 and octadecene-1, and branched olefins such as 3-methylbutene-1, 4-methylpentene-1 and 4,4-dimethylpentene-1. The amount of such an olefin is usually about 20% by weight or less, preferably 0 to 15% by weight. This kind of copolymer is excellent in transparency.

The polypropylene having the substantially syndiotactic structure can be prepared by the above-mentioned J. A. Ewen et al. method. In this case, any catalyst which is different from the Ewen et al. catalyst can be employed herein, so long as it can provide the syndiotactic polypropylene having a syndiotactic pentad fraction of more than 0.7 when propylene is singly polymerized.

The method using the above-mentioned catalyst can be applied to the manufacture of the copolymer of the polypropylene and another olefin.

In the polypropylene having the substantially syndiotactic structure used in the present invention, a peak intensity which is observed at about 20.2 ppm on the basis of tetramethylsilane when measured in a 1,2,4-trichlorobenzene solution at 135° C. by $^{13}$C-NMR is preferably 0.3 or more, particularly preferably 0.5 or more of the total peak intensity attributed to the methyl group of propylene (in the case of the homopolymer of propylene, this ratio can be represented by a syndiotactic pentad fraction of 0.7 or more, particularly 0.75 or more). When the value of the above-mentioned ratio is less than 0.3, the polypropylene is poor in physical properties, and the surfaces of molded articles thereof are inconveniently sticky.

Of the aforesaid polymerization methods, the process of using a polymerization catalyst comprising a transition metal compound having an asymmetric ligand and aluminoxane can provide the syndiotactic polypropylene having a relatively good tacticity. Examples of the transition metal compound having the asymmetric ligand include isopropyl(cyclopentadienyl-1-fluorenyl)-hafnium dichloride and isopropyl(cyclopentadienyl-1-fluorenyl)-zirconium dichloride which are disclosed by J. A. Ewen, and these compounds in which one or two of chlorine atoms are replaced with other halogens or alkyl groups having 1 to 5 carbon atoms.

Examples of the aluminoxane include compounds represented by the general formula

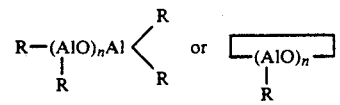

(wherein R is a hydrocarbon residue having 1 to 3 carbon atoms). In particular, what is suitably used is the aluminoxane in which R is a methyl group and n is 5 or more, preferably from 10 to 100.

The amount of the aluminoxane used is from 10 to 1,000,000 mole times, usually from 50 to 5,000 mole times as much as that of the transition metal compound.

No particular restriction is put on polymerization conditions, and various known polymerization processes are utilizable such as solvent polymerization using an inert solvent, mass polymerization in which there is substantially no inert solvent, and gas phase polymerization. Usually, the polymerization temperature is from $-100°$ to 200° C. and the polymerization pressure is from atmospheric pressure to 100 kg/cm$^2$-G. The polymerization at a temperature of from $-100°$ to 100° C. and a pressure of from atmospheric pressure to 50 kg/cm$^2$-G is preferred.

When the propylene is singly polymerized or is copolymerized with another olefin in the presence of the above-mentioned polymerization catalyst under the above-mentioned polymerization conditions, a (co)polymer is obtained in which a peak intensity observed at about 20.2 ppm on the basis of tetramethylsilane when measured in a 1,2,4-trichlorobenzene solution at 135° C. by $^{13}$C-NMR is 0.3 or more of the total peak intensity attributed to the methyl group of propylene.

In order to further heighten the syndiotacticity fraction of the (co)polymer, it is effective to wash the (co)polymer with a hydrocarbon solvent having 3 to 20 carbon atoms. Examples of the hydrocarbon solvent include propylene itself; saturated hydrocarbon compounds such as propane, butane, pentane, hexane, heptane, octane and nonane; aromatic hydrocarbon compounds such as benzene, toluene, xylene and ethylbenzene; and these compounds in which a part or all of hydrogen atoms are replaced with fluorine, chlorine, bromine or iodine. Examples of other usable solvents include alcohols having 1 to 20 carbon atoms, ethers having 2 to 20 carbon atoms and esters which can dissolve or disperse a low-molecular atactic component. No particular restriction is put on a washing manner. The washing is usually carried out at a temperature of from 0° to 100° C.

For the purpose of obtaining the (co)polymer having the high syndiotacticity fraction, it is also effective to carry out the polymerization by the use of the catalyst having a high purity, usually 90% or more, and at a relatively low temperature, usually 100° C. or less.

In the present invention, the preferable molecular weight of the propylene (co)polymer having the substantially syndiotactic structure is from 0.1 to 10, preferably from 0.5 to 5.0 in terms of an intrinsic viscosity as measured in a tetralin solution at 135° C. Furthermore, a ratio Mw/Mn between weight-average molecular weight (Mw) and number-average molecular weight (Mn) of the above-mentioned (co)polymer is preferably from 1.5 to 15, as measured at 135° C. by gel permeation chromatography.

In the present invention, a part of the propylene (co)polymer having the substantially syndiotactic structure can be replaced with the propylene (co)polymer having an isotactic structure in a ratio of, for example, less than 50% by weight, preferably 40% by weight or less. When the amount of the propylene (co)polymer having the isotactic structure is 50% by weight or more, impact strength is poor. The propylene (co)polymer having the isotactic structure can be prepared by any known process, and what can be preferably used has an isotactic pentad fraction of 0.90 or more when measured by $^{13}$C-NMR. When the propylene (co)polymer having the syndiotactic structure is partially replaced with the propylene polymer or copolymer having the isotactic structure, the resin composition having higher stiffness can be obtained.

With regard to the nucleating agent to be added to the polypropylene having the substantially syndiotactic structure in which a peak intensity observed at about 20.2 ppm on the basis of tetramethylsilane when measured in a 1,2,4-trichlorobenzene solution at 135° C. by $^{13}$C-NMR is preferably 0.3 or more of the total peak intensity attributed to the methyl group of propylene, any kind of nucleating agent can be used, so long as it can raise the crystallization temperature of the polypropylene. Usually, the usable nucleating agents have higher melting points and lower contact energy with the polypropylene. The nucleating agents for the isotactic propylene are also usable.

Typical examples of the nucleating agent include metallic salts of aromatic monocarboxylic acids such as benzoic acid, toluic acid and p-tert-butylbenzoic acid; dibenzylidene sorbitols such as 1,3.2,4-di(benzylidene) sorbitol, 1,3.2,4-di(p-methylbenzylidene) sorbitol and 1,3.2,4-di(p-ethylbenzylidene) sorbitol; metallic salts of aromatic phosphorus compounds such as sodium bis(4-tert-butylphenyl) phosphate and sodium methylenebis(2,4-di-tert-butylphenol) phosphate; polymers having high melting points such as polyvinylcyclohexane, poly-3-methylbutene, crystalline polystyrene and polytrimethylvinylsilane; quinacridones such as 2,3-quinacridone, dihydroxyquinacridone and acetylated quinacridone; and inorganic compounds such as talc, kaolin and mica. These nucleating agents may be used singly or in combination.

The amount of the nucleating agent used is usually from 0.001 ppm to 1% by weight, preferably from 0.01 ppm to 0.8% by weight, more preferably from 0.1 ppm to 0.5% by weight, depending upon the kind of nucleating agent.

Unless the resin composition has a higher crystallization temperature than a material polypropylene containing no nucleating agent by 5° C. or more, physical properties are scarcely improved. Therefore, it is preferred that the amount of the nucleating agent is selected so that the crystallization temperature of the resin composition may be higher than that of the material polypropylene by 5° C. or more in which no nucleating agent is contained.

No particular restriction is put on a mixing manner of the syndiotactic polypropylene and the nucleating agent, and thus a usual way which is used in mixing a polyolefin with additives can be utilized without any modification. The mixing is usually carried out at a temperature of a melting point or less of the syndiotactic polypropylene in a mixing machine such as a Henschel mixer. Usually, the resultant mixture is then melted and mixed by means of an extruder in order to form pellets.

In mixing with the nucleating agent, various additives can be added together which are, for example, an antioxidant, a lubricant, an ultraviolet absorber, an ultraviolet stabilizer, a thermal stabilizer, an antistatic agent and an organic and inorganic pigment. They can be used singly or in combination. Typical examples of these additives are those which are usually added to the polyolefin resin, and they can be used in such an amount that the effect of the present invention is not impaired noticeably.

The present invention will de described below in more detail in reference to examples and comparative examples. These examples do not intent to limit the scope of the present invention but to elucidate the same.

Example 1

In 1 liter of toluene were dissolved 10 mg of isopropyl(cyclopentadienyl-1-fluorenyl)zirconium dichloride and 1.34 g of methylaluminoxane having a polymerization degree of about 15. The above isopropyl(cyclopentadienyl-1-fluorenyl)zirconium dichloride was that which had been obtained by introducing lithium into isopropylcyclopentadienyl-1-fluorene synthesized in an ordinary manner and then reacting the same with zirconium tetrachloride, and the aforesaid methylaluminoxane was that which had been obtained by reacting copper sulfate hexahydrate with trimethylaluminum in toluene. The resultant solution was placed in a 2-liter autoclave, and polymerization was then carried out at 50° C. under a gauge pressure of 2 kg/cm$^2$-G for 1 hour.

After the polymerization, the unreacted propylene was purged, and the polymerization mixture was filtered to obtain a polymer. The polymer was then washed with 500 ml of toluene five times. The washed polymer was then dried at 80° C. under reduced pressure, thereby obtaining 28 g of a syndiotactic polypropylene.

According to $^{13}$C-NMR analysis, a syndiotactic pentad fraction of this polypropylene was 0.902, and the intrinsic viscosity $\eta$ thereof was 0.88, as measured in a tetralin solution at 135° C.

This polypropylene was mixed with talc in a weight ratio of 1/1,000, and the resultant composition was then press-molded at 250° C. in order to form a sheet having a thickness of 1 mm. For this sheet, the following physical properties were measured.

| | |
|---|---|
| Flexural stiffness (ASTM D747): | 6,100 kg/cm$^2$ (23° C.) |
| Tensile yield strength (ASTM D638): | 255 kg/cm$^2$ (23° C.) |
| Elongation (ASTM D638): | 517% (23° C.) |
| Izod impact strength (notched) (ASTM D256): | 14.2 kg · cm/cm (23° C.) 2.3 kg · cm/cm (−10° C.) |
| Crystallization temperature: | 105.4° C. |

Comparative Example 1

The same procedure as in Example 1 was effected except that any nucleating agent was not added, in order to obtain a sheet having a thickness of 1 mm. Physical properties of this sheet were as follows:

| | |
|---|---|
| Flexural stiffness: | 4,700 kg/cm$^2$ (23° C.) |
| Tensile yield strength: | 204 kg/cm$^2$ (23° C.) |
| Elongation: | 740% (23° C.) |
| Izod impact strength (notched): | 14.1 kg cm/cm (23° C.) 2.1 kg cm/cm (−10° C.) |
| Crystallization temperature: | 96.8° C. |

Example 2

The same procedure as in Example 1 was effected except that aluminum benzoate was used as a nucleating agent, in order to obtain a sheet having a thickness of 1 mm. Physical properties of this sheet were as follows:

| | |
|---|---|
| Flexural stiffness: | 5,900 kg/cm$^2$ (23° C.) |
| Tensile yield strength: | 254 kg/cm$^2$ (23° C.) |
| Elongation: | 520% (23° C.) |
| Izod impact strength (notched): | 14.5 kg · cm/cm (23° C.) 2.5 kg · cm/cm (−10° C.) |
| Crystallization temperature: | 102.5° C. |

Example 3

In a 5-liter autoclave were charged 1,500 g of propylene, and a solution was then added thereto at 30° C. which had been prepared by dissolving 10 mg of isopropyl-(cyclopentadienyl-1-fluorenyl)zirconium dichloride and 1.3 g of methylaluminoxane, both being obtained in the same manner as in Example 1, in 10 ml of toluene. Polymerization was then conducted with stirring at 30° C. for 1 hour.

After completion of the polymerization, the unreacted propylene was purged from the polymerization mixture. The resultant polymer was then dried at 80° C. under reduced pressure, In 500 ml of hexane was dispersed 68 g of the thus obtained polymer, the dispersion was then stirred and mixed at 70° C. filtered, and then dried at 80° C. under reduced pressure to obtain 51 g of a powdery syndiotactic polypropylene. According to $^{13}$C-NMR analysis, the syndiotactic pentad fraction of this polypropylene was 0.914, and the intrinsic viscosity $\eta$ thereof was 1.28, as measured in a tetralin solution at 135° C.

This polypropylene was mixed with 2,3-quinacridone as a nucleating agent in a weight ratio of 1/100,000, and a sheet having a thickness of 1 mm was then formed in the same manner as in Example 1. The physical properties of this sheet were as follows:

| | |
|---|---|
| Flexural stiffness: | 6,000 kg/cm$^2$ (23° C.) |
| Tensile yield strength: | 258 kg/cm$^2$ (23° C.) |
| Elongation: | 540% (23° C.) |
| Izod impact strength (notched): | 38.0 kg · cm/cm (23° C.) 3.6 kg · cm/cm (−10° C.) |
| Crystallization temperature: | 103.5° C. |

Comparative Example 2

The same procedure as in Example 3 was effected except that any nucleating agent was not added, in order to obtain a sheet having a thickness of 1 mm. Physical properties of this sheet were as follows:

| | |
|---|---|
| Flexural stiffness: | 4,800 kg/cm$^2$ (23° C.) |
| Tensile yield strength: | 220 kg/cm$^2$ (23° C.) |
| Elongation: | 625% (23° C.) |
| Izod impact strength (notched): | 36.5 kg · cm/cm (23° C.) 3.5 kg · cm/cm (−10° C.) |
| Crystallization temperature: | 97.5° C. |

Example 4

In a 200-liter autoclave were placed 0.1 g of isopropyl(cyclopentadienyl-1-fluorenyl)hafnium dichloride, 0.1 g of isopropyl(cyclopentadienyl-1-fluorenyl)-zirconium dichloride (which were synthesized by the process of Example 1 and then purified by recrystallization), 30 g of methylaluminoxane (polymerization degree 16.1, made by Toyo Acuzo Co., Ltd.) and 80 liters of toluene. The above isopropyl(cyclopentadienyl-1-fluorenyl)hafnium dichloride was that which had been obtained by introducing lithium into isopropylcyclopentadienyl-1-fluorene synthesized in an ordinary manner, reacting the same with hafnium tetrachloride (containing 5% by weight of zirconium tetrachloride), and then recrystallizing the resultant reaction product. Polymerization was carried out at 20° C. under a gauge pressure of 3 kg/cm$^2$-G for 2 hour.

After completion of the polymerization, the unreacted propylene was purged, and the polymerization mixture was then subjected to a deliming treatment with 40 liters of methanol and 0.2 liter of methyl acetoacetate, followed by washing with 10 liters of a 3% by weight aqueous hydrochloric acid solution. The thus washed polymerization mixture was then filtered in order to obtain 4.6 kg of syndiotactic polypropylene. According to $^{13}$C-NMR analysis, the syndiotactic pentad fraction of this polypropylene was 0.904, and the intrinsic viscosity $\eta$ thereof was 1.68, as measured in a tetralin solution at 135° C. Furthermore, the ratio Mw/Mn of weight-average molecular weight (Mw) to number-average molecular weight (Mn) measured in 1,2,4-trichlorobenzene was 5.2.

This polypropylene was mixed with 0.01% by weight of 2,4-di-tert-butyl-p-cresol and 0.1% by weight of a phosphoric nucleating agent (NA-11, made by Adeca Argas Co., Ltd.) and was granulated by an extruder and then press-molded to obtain a sheet having a thickness of 1 mm. The physical properties of this sheet were as follows:

| | |
|---|---|
| Flexural stiffness: | 5,600 kg/cm$^2$ (23° C.) |
| Tensile yield strength: | 230 kg/cm$^2$ (23° C.) |
| Elongation: | 280% (23° C.) |
| Izod impact strength (notched): | 28.0 kg · cm/cm (23° C.) |
| | 3.6 kg · cm/cm (−10° C.) |
| Crystallization temperature: | 91.0° C. |

Comparative Example 3

The same procedure as in Example 4 was effected except that any phosphoric nucleating agent was not added, in order to obtain a sheet having a thickness of 1 mm. Physical properties of this sheet were as follows:

| | |
|---|---|
| Flexural stiffness: | 5,250 kg/cm$^2$ (23° C.) |
| Tensile yield strength: | 210 kg cm$^2$ (23° C.) |
| Elongation: | 420% (23° C.) |
| Izod impact strength (notched): | 12.7 kg · cm/cm (23° C.) |
| | 3.6 kg · cm/cm (−10° C.) |
| Crystallization temperature: | 69.6° C. |

Example 5

The same procedure as in Example 4 was effected except that 4 liter of hexane-1 and propylene were used, in order to obtain a copolymer containing 6% by weight of hexene. According to $^{13}$C-NMR, the peak intensity at about 20.2 ppm of this copolymer was 0.68 of the total peak attributed to the methyl group of the propylene unit. This fact indicates that the obtained copolymer has a substantially syndiotactic structure. Furthermore, Mw/Mn was 4.5

The same additives as used in Example 4 were added to the copolymer in the same amounts, and a sheet having a thickness of 1 mm was formed by the same molding operation. Physical properties of the sheet were then measured, and the results were as follows:

| | |
|---|---|
| Flexural stiffness: | 5,400 kg/cm$^2$ (23° C.) |
| Tensile yield strength: | 230 kg/cm$^2$ (23° C.) |
| Elongation: | 380% (23° C.) |
| Izod impact strength (notched): | 26.0 kg · cm/cm (23° C.) |
| | 3.8 kg · cm/cm (−10° C.) |
| Crystallization temperature: | 86.3° C. |
| Haze (ASTM D1003): | 47% |

The sheet made from the above copolymer was very excellent in transparency.

Comparative Example 4

The same procedure as in Example 5 was effected except that no nucleating agent was used, in order to obtain a sheet having a thickness of 1 mm. Physical properties of the sheet were measured, and the results were as follows:

| | |
|---|---|
| Flexural stiffness: | 5,100 kg/cm$^2$ (23° C.) |
| Tensile yield strength: | 220 kg/cm$^2$ (23° C.) |
| Elongation: | 460% (23° C.) |
| Izod impact strength (notched): | 18.5 kg · cm/cm (23° C.) |
| | 3.7 kg · cm/cm (−10° C.) |
| Crystallization temperature: | 68.3° C. |

Example 6

70 parts by weight of the syndiotactic polypropylene obtained in Example 1 was mixed with 30 parts by weight of a commercially available isotactic polypropylene (whose isotactic pentad fraction by $^{13}$C-NMR was 0.962 and intrinsic viscosity $\eta$ in a tetralin solution at 135° C. was 1.62). The Mw/Mn ratio of the resultant mixture was 7.5. Talc was then added to this mixture in a weight ratio of 1/1,000, and a sheet having a thickness of 1 mm was formed from the resultant polypropylene composition in the same manner as in Example 1. Physical properties of this sheet were as follows:

| | |
|---|---|
| Flexural stiffness: | 7,800 kg/cm$^2$ (23° C.) |
| Tensile yield strength: | 280 kg/cm$^2$ (23° C.) |
| Elongation: | 140% (23° C.) |
| Izod impact strength (notched): | 12.3 kg · cm/cm (23° C.) |
| | 2.8 kg · cm/cm (−10° C.) |
| Crystallization temperature: | 90.5° C. |
| (when attributed to the polypropylene having a syndiotactic structure) | 120.5° C. |
| (when attributed to the polypropylene having an isotactic structure) | |

Comparative Example 5

The same procedure as in Example 6 was effected except that any nucleating agent was not used, in order to form a sheet having a thickness of 1 mm. Physical properties of this sheet were as follows:

| | |
|---|---|
| Flexural stiffness: | 7,300 kg/cm$^2$ (23° C.) |
| Tensile yield strength: | 268 kg/cm$^2$ (23° C.) |
| Elongation: | 64% (23° C.) |
| Izod impact strength (notched): | 13.3 kg · cm/cm (23° C.) |
| | 2.8 kg · cm/cm (−10° C.) |
| Crystallization temperature: | 66.5° C. |
| (when attributed to the polypropylene having a syndiotactic structure) | 110.2° C. |
| (when attributed to the polypropylene having an isotactic structure) | |

Example 7

The same procedure as in Example 3 was effected except that 1 mg of the isopropyl(cyclopentadienyl-1-fluorenyl)zirconium dichloride obtained in the same manner as in Example 4 was used and a polymerization temperature was 60° C. in order to 185 g (dry weight) of a syndiotactic polypropylene. The intrinsic viscosity $\eta$ of this polypropylene measured in a tetralin solution at 135° C. was 0.92, and the syndiotactic pentad fraction thereof by $^{13}$C-NMR was 0.812.

As in Example 1, talc as a nucleating agent was then added to this polypropylene, and a sheet having a thickness of 1 mm was formed therefrom. Physical properties of this sheet were as follows:

| | |
|---|---|
| Flexural stiffness: | 5,800 kg cm$^2$ (23° C.) |
| Tensile yield strength: | 240 kg cm$^2$ (23° C.) |
| Elongation: | 120% (23° C.) |
| Izod impact strength (notched): | 12.8 kg · cm/cm (23° C.) |
| | 2.4 kg · cm/cm (−10° C.) |
| Crystallization temperature: | 91.3° C. |

Comparative Example 6

The same procedure as in Example 7 was effected except that talc was not used, in order to form a sheet having a thickness of 1 mm, and physical properties of this sheet were measured. The results are as follows:

| | |
|---|---|
| Flexural stiffness: | 4,600 kg/cm$^2$ (23° C.) |
| Tensile yield strength: | 204 kg cm$^2$ (23° C.) |
| Elongation: | 620% (23° C.) |
| Izod impact strength (notched): | 12.0 kg · cm/cm (23° C.) |
| | 2.3 kg · cm/cm (−10° C.) |
| Crystallization temperature: | 71.0° C. |

As is apparent from the above examples and comparative examples, the syndiotactic polypropylene resin composition according to the present invention has a high crystallization temperature, and molded articles thereof are also excellent in flexural stiffness and tensile yield strength.

We claim:

1. A syndiotactic polypropylene resin composition comprising
   (A) a polypropylene selected from the group consisting of
   (a) a propylene homopolymer having a syndiotactic pentad fraction of 0.7 or more,
   (b) a copolymer of propylene and an olefin other than propylene having 2 to 25 carbon atoms, in which copolymer the ratio of a peak intensity observed at about 20.2 ppm on the basis of tetramethylsilane when measured in a 1,2,4-trichlorobenzene solution at 135° C. by $^{13}$C-NMR to the total peak intensity attributed to the methyl group of propylene is 0.5 or more, and
   (c) a mixture of said homopolymer or copolymer and an isotactic propylene (co)polymer having an isotactic pentad fraction of 0.90 or more when measured by $^{13}$C-NMR, the amount of the isotactic propylene (co)polymer being less than that of propylene homopolymer (a) or copolymer (b), and
   (B) 0.001 ppm to 1% by weight of a nucleating agent.

2. The resin composition according to claim 1 wherein said nucleating agent is at least one member selected from the group consisting of metallic salts of aromatic monocarboxylic acids, dibenzylidene sorbitols, metallic salts of aromatic phosphorus compounds, quinacridones, polymers having high melting points and minerals.

3. The resin composition according to claim 1 wherein said nucleating agent is a metallic salt of benzoic acid, toluic acid or p-tert-butylbenzoic acid.

4. The resin composition according to claim 1 wherein said nucleating agent is 1,3.2,4-di(benzylidene) sorbitol, 1,3.2,4-di(p-methylbenzylidene) sorbitol or 1,3.2,4-di(p-ethylbenzylidene) sorbitol.

5. The resin composition according to claim 1 wherein said nucleating agent is sodium bis(4-tert-butylphenyl) phosphate or sodium methylenebis(2,4-di-tert-butylphenol) phosphate.

6. The resin composition according to claim 1 wherein said nucleating agent is 2,3-quinacridone.

7. The resin composition according to claim 1 wherein said nucleating agent is polyvinylcyclohexane, poly-3-methylbutene, crystalline polystyrene or polytrimethylvinylsilane.

8. The resin composition according to claim 1 wherein said nucleating agent is talc, kaolin or mica.

9. The resin composition according to claim 1 wherein the amount of said nucleating agent is in the range of from 0.1 ppm to 0.5% by weight.

10. The resin composition according to claim 1 which has a crystallization temperature higher than that of said polypropylene (A) alone by 5° C. or more, as measured by differential scanning calorimetry.

11. The resin composition according to claim 1 wherein propylene copolymer (b) contains 20% by weight or less of an olefin other than propylene having 2 to 25 carbon atoms.

12. The resin composition according to claim 1 wherein the amount of said isotactic propylene (co)polymer having an isotactic pentad fraction of 0.90 or more when measured by $^{13}$C-NMR is less than 50% by weight of said mixture.

13. The resin composition according to claim 1 wherein the intrinsic viscosity of propylene homopolymer (a) or copolymer (b) in a tetralin solution at 135° C. is in the range of from 0.1 to 10.

14. The resin composition according to claim 1, wherein propylene homopolymer (a) has s syndiotactic pentad fraction of 0.75 or more.

* * * * *

UNITED STATES PATENT AND TRADEMARK OFFICE
CERTIFICATE OF CORRECTION

PATENT NO. : 5,278,216
DATED : January 11, 1994
INVENTOR(S) : Asanuma et al

It is certified that error appears in the above-indentified patent and that said Letters Patent is hereby corrected as shown below:

On the title page, insert item [30] Priority Data  PCT   PCT/JP90/004
04-10-90

Signed and Sealed this

Seventeenth Day of January, 1995

Attest:

BRUCE LEHMAN

*Attesting Officer*   *Commissioner of Patents and Trademarks*